Oct. 16, 1923.
L. MELERO
ANIMAL TRAP
Filed Oct. 11, 1922
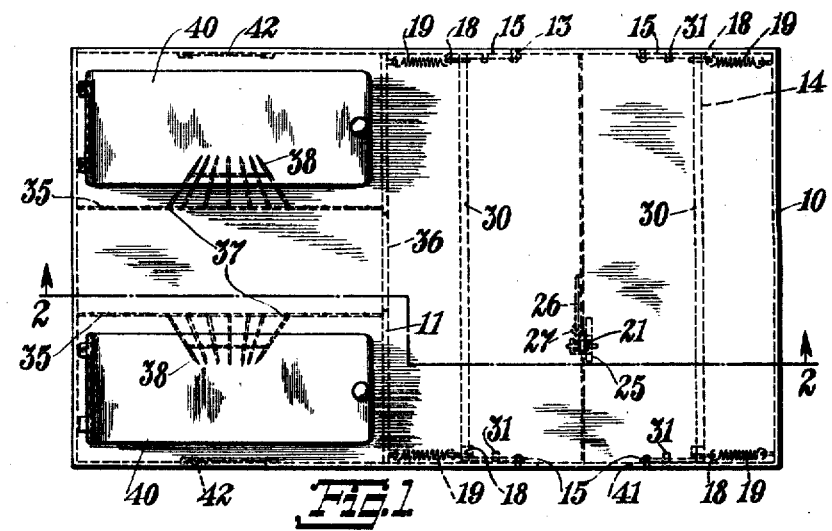
FIG.1
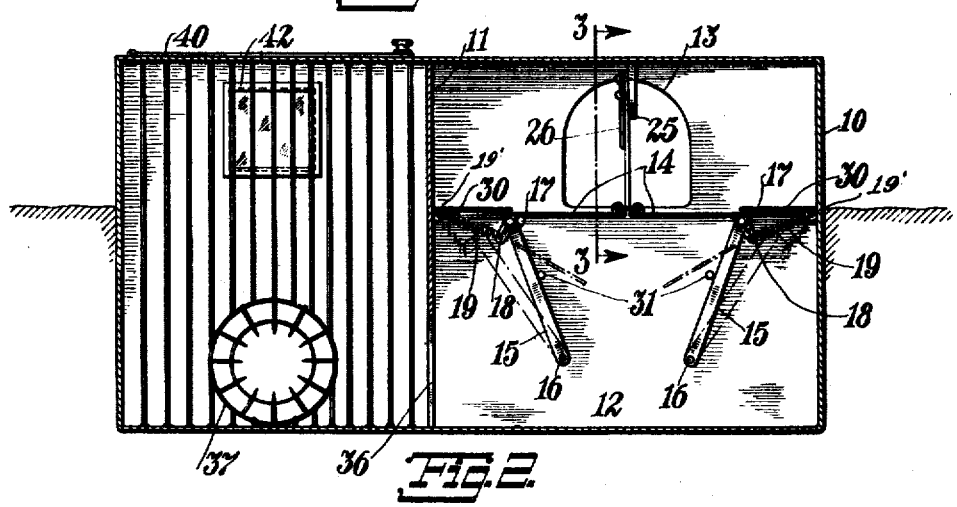
FIG.2
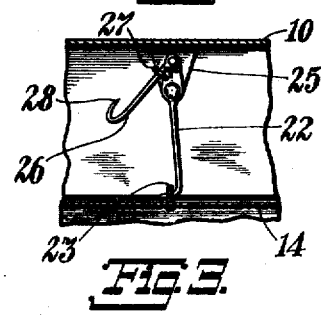
FIG.3
Inventor
Luciano Melero
By
Attorney Patented Oct. 16, 1923.

1,471,047

UNITED STATES PATENT OFFICE.

LUCIANO MELERO, OF OWENSMOUTH, CALIFORNIA.

ANIMAL TRAP.

Application filed October 11, 1922. Serial No. 593,678.

*To all whom it may concern:*

Be it known that I, LUCIANO MELERO, a citizen of the Republic of Mexico, residing at Owensmouth, in the county of Los Angeles and State of California, have invented certain new and useful Improvements in Animal Traps, of which the following is a specification.

This invention relates to animal traps, having more particular reference to traps of the type comprising a cage or enclosure in which the animal is penned.

The invention has for an object to provide a novel and efficient trap of the above type.

For further comprehension of the invention, and of the objects and advantages thereof, reference will be had to the following description and accompanying drawings, and to the appended claims in which the various novel features of the invention are more particularly set forth.

Fig. 1 of the drawings is a plan view of an animal trap constructed according to my invention.

Fig. 2 is a longitudinal vertical section on the line 2—2 of Fig. 1.

Fig. 3 is a fragmentary transverse vertical section illustrating the trigger device, this view being taken along the line 3—3 of Fig. 2.

As here embodied my improved trap is in the form of a box or cage 10. Extending across this box, toward one end thereof, is a transverse partition 11. Located in one of the side walls of the larger compartment, 12, into which the box is thus divided is an opening 13 through which the animal may enter onto a double trap door 14 comprising a pair of leaves, these leaves meeting on a line extending transversely of the box in registry with the opening 13. The trap door leaves 14 are hinged at their opposed, or removed, edges to the upper ends of pairs of arms 15, the respective arms of each pair being located adjacent the opposite sides of the box. These arms 15 are pivotally connected at their lower ends as at 16 to the sides of the box and are attached at their upper ends to ears 17 fixed on the undersides of the trap door leaves 14. These ears 17 have downward finger extensions 18 to which are connected one end of the coiled tension springs 19 whose opposite ends are connected to suitable fixed parts such as the eyes indicated at 19' on the undersides of the floor elements 30 to be presently referred to, the springs 19 being under tension when the doors are closed.

The trap doors 14 are held in closed position by means of a pair of claws or prongs 21 on the lower end of a lever 22, these prongs engaging eyes 23 on the leaves of the doors 14. The lever 22 is fulcrumed a short distance from its upper end to a bracket 25 depending from the top of the box 10. To the upper end of the lever is connected a rod 26 passing loosely through an eye 27 on the bracket 25 and extending toward the entrance opening 13, preferably at a slight downward inclination as shown in Fig. 3, and having its free end in the form of a bait hook 28.

Acting in conjunction with the door 14 in dividing the compartment 12 into upper and lower sections are floor strips 30 under which the leaves of the door swing when the latter open. Fixed to the side walls of the box are pins 31 which act both to limit the movement of the arms 15 toward one another and also to limit the downward movement of the door leaves, holding the latter in an inclined position, leaving a space just sufficient for the animal to fall through.

The other compartment of the box may be divided by longitudinal partitions 35 into three chambers, as shown in Fig. 1, an opening 36 in the transverse partition leading into the central chamber from the main compartment 12. while openings 37 are formed in the partitions 35, these openings having inclined prongs 38 spaced therearound to prevent return of the animal once it has entered one of the side chambers, the tops of these chambers being in the form of doors 40 through which the animal may be removed from the trap.

In the wall of the trap opposite the entrance opening 13, a grated opening 41 may be provided, while like openings 42 may be provided in the trap wall adjacent the side chambers above referred to.

When an animal enters the trap and pulls on the bait hook 28 the prongs 21 on lever 22 disengage from the eyes 23 on the door leaves 14, and the latter open, being given a compound movement, both outwardly away from one another as the arms 15 rock on their pivots, and downwardly as the door leaves swing on the upper ends of the said arms.

Having thus described my invention what I claim as new and desire to protect by Let- ters Patent of the United States is as follows:

1. An animal trap, comprising a box having an opening through which the animal enters, a double-leaved trap door, means for holding the two leaves of the trap door closed, and a bait holding element adapted to release the said means, the said means comprising a double pronged lever having its prongs individually holding the respective leaves closed.

2. An animal trap, comprising a box having an opening through which the animal enters, a double-leaved trap door, means for holding the two leaves of the trap door closed, and a bait holding element adapted to release the said means, said means comprising a double pronged lever engaging eyes on the door leaves.

3. In an animal trap, a double-leaved hinged trap door, and means for giving the leaves of the door a compound opening movement both bodily away from one another and pivotally upon their hinges, said means including spring elements operatively engaged with the respective leaves.

4. In an animal trap, a double-leaved hinged trap door, and means for giving the leaves of the door a compound opening movement, both bodily away from one another and pivotally upon their hinges.

5. In an animal trap, a doubled-leaved trap door, pairs of pivoted arms on the upper ends of which the door leaves are pivoted, short fingers projecting downward from the hinge edges of the doors, and tension springs connected to said fingers, means holding the door leaves closed against the action of said springs, and a bait holding device adapted to release said means.

In testimony whereof I have affixed my signature.

LUCIANO MELERO.